No. 729,231. Patented May 26, 1903.

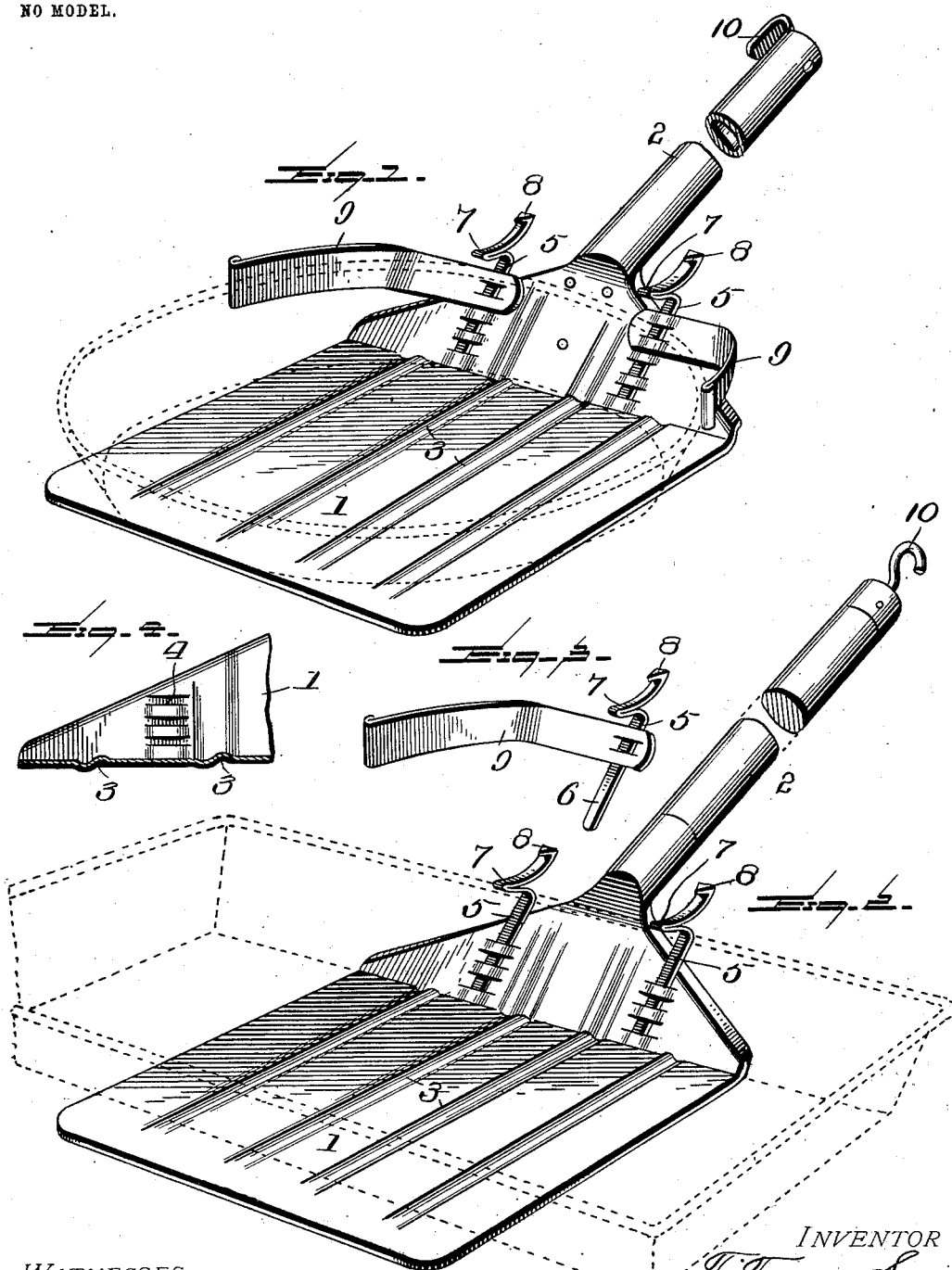

UNITED STATES PATENT OFFICE.

THOMAS TOWSON SMITH, OF NEAR WARRENTON, VIRGINIA.

AUTOMATIC SPRING PAN-LIFTER.

SPECIFICATION forming part of Letters Patent No. 729,231, dated May 26, 1903.

Application filed August 5, 1902. Serial No. 118,485. (No model.)

*To all whom it may concern:*

Be it known that I, THOMAS TOWSON SMITH, a citizen of the United States, residing near Warrenton, in the county of Fauquier and State of Virginia, have invented certain new and useful Improvements in Automatic Spring Pan-Lifters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to pan-lifters, and has for its object to provide an automatic spring pan-lifter and remover of pie-plates, cake-molds, and other similar cooking utensils with cleanliness and despatch.

With this object in view my invention consists in providing a pan-lifter with removable automatic spring pan-holders.

My invention also consists in providing means for engaging pie-plates, cake-molds, &c.

My invention consists also in certain other novel features of construction and in combination of parts, which will be first fully described and afterward specifically pointed out in the appended claims.

Referring to the accompanying drawings, Figure 1 is a perspective view of my invention, showing pie-plate in dotted lines. Fig. 2 is a perspective view of my invention, showing pan in dotted lines. Fig. 3 is a detail view of automatic spring pan-holder and pie-plate holder. Fig. 4 is a fragmentary view of portion of pan-holder, showing means of holding the spring pan-holders.

Like numerals of reference indicate the same parts throughout the several figures, in which—

1 is the pan-holder, having the handle 2. (Shown riveted thereto in Fig. 1 and of wood in Fig. 2.) The bottom of the pan-holder is provided with corrugations 3. The back of the pan-holder is provided with a series of slots, being alternately pressed in opposite directions, so as to form a holding means for the spring pan-holders 5, as clearly shown in Fig. 2. Said automatic spring pan-holders 5 are provided with a shank 6, which passes into the pan-holder, and a forward projection 7, having a rounded bottom, the upper end of said holder being pointed and extending forwardly to form a perforator 8 for bread or the like, as it frequently happens that the bread in a pan rises so that the rounded projection 7 cannot engage the edge of the pan. In this instance the point 8 will perforate the crust of the bread and hold the same.

9 indicates the spring pie-plate holders, which are attached to the spring pan-holders, preferably as shown in Fig. 3. I also provide a hook 10 on the end of the handle 2 for the purpose of suspending the pan-holder or for opening a stove-door.

It will be noticed that the angle or incline of the portion holding the spring pan-holders is of such a degree that the pan-holders can be disengaged from the pan by simply resting the forward edge of the pan on a table and raising the handle of the lifter.

Having thus described my invention, its operation is as follows: My invention is designed to obviate and prevent burned hands and arms when removing a pan from a stove, and in the case of removing a pie-plate the pan-lifter is slid under the plate until the holders 9 engage the same sufficiently to prevent the plate from sliding sidewise. In removing a pan, as shown in Fig. 2, the lifter is slid under the same until the holders 5 engage the edge of the pan, the projection 7 automatically springing over the same. As is plainly seen, the spring pan-holders may be raised or lowered, so as to accommodate pans of a different height, and the pie-plate holders may be attached or not, as desired.

Having thus set forth my invention, I do not wish to be understood as limiting myself to the exact construction herein set forth, as various slight changes may be made therein by those skilled in the art, and I consider myself clearly entitled to all such changes and modifications that fall within the limit and scope of my invention as defined by the following claims.

What I claim as my invention, and desire to secure by Letters Patent of the United States, is—

1. In a pan-lifter, the combination with the body portion of spring pan-holders secured thereto and independent means for engaging a pie-plate detachably secured to said pan-lifter.

2. In a pan-lifter, the combination with the body portion of spring pan-holders secured thereto, independent means for engaging a pie-plate removably secured to said pan-holders.

In testimony whereof I affix my signature in presence of two witnesses.

T. TOWSON SMITH.

Witnesses:
HERBERT C. EMERY,
C. HUGH DUFFY.